US 11,703,391 B2

(12) United States Patent
Howells

(10) Patent No.: US 11,703,391 B2
(45) Date of Patent: Jul. 18, 2023

(54) CONTINUOUS SPECTRA TRANSMISSION PYROMETRY

(71) Applicant: Applied Materials, Inc., Santa Clara, CA (US)

(72) Inventor: Samuel C. Howells, Portland, OR (US)

(73) Assignee: Applied Materials, Inc., Santa Clara, CA (US)

( * ) Notice: Subject to any disclaimer, the term of this patent is extended or adjusted under 35 U.S.C. 154(b) by 337 days.

(21) Appl. No.: 17/085,942

(22) Filed: Oct. 30, 2020

(65) Prior Publication Data

US 2021/0055165 A1 Feb. 25, 2021

Related U.S. Application Data

(62) Division of application No. 15/990,377, filed on May 25, 2018, now Pat. No. 10,845,249.

(Continued)

(51) Int. Cl.
| G01K 15/00 | (2006.01) |
| G01J 5/10 | (2006.01) |
| G01J 5/00 | (2022.01) |
| G01J 5/60 | (2006.01) |
| G01J 5/0821 | (2022.01) |
| G01J 5/58 | (2022.01) |
| G01J 5/0818 | (2022.01) |

(Continued)

(52) U.S. Cl.
CPC .............. *G01J 5/10* (2013.01); *G01J 5/0007* (2013.01); *G01J 5/0818* (2013.01); *G01J 5/0821* (2013.01); *G01J 5/0896* (2013.01); *G01J 5/53* (2022.01); *G01J 5/58* (2013.01); *G01J 5/60* (2013.01); *G01J 5/80* (2022.01); *H05B 3/0038* (2013.01)

(58) Field of Classification Search
CPC combination set(s) only.
See application file for complete search history.

(56) References Cited

U.S. PATENT DOCUMENTS 5,991,479 A  11/1999 Kleinerman
7,112,763 B2  9/2006 Hunter et al.
(Continued)

FOREIGN PATENT DOCUMENTS

TW   I434031 B   4/2014

OTHER PUBLICATIONS

NKT Photonics; SuperK Compact; Compact Single Mode White Light Source; date unknown; 2 total pages.
(Continued)

*Primary Examiner* — Lisa M Caputo
*Assistant Examiner* — Nasir U. Ahmed
(74) *Attorney, Agent, or Firm* — Patterson + Sheridan, LLP

(57) ABSTRACT

An apparatus for processing substrates includes a continuum radiation source, a source manifold optically coupled to the continuum radiation source and comprising: a plurality of beam guides, each having a first end that optically couples the beam guide to the continuum radiation source; and a second end. The apparatus also includes a detector manifold to detect radiation originating from the source manifold and transmitted through a processing area, and one or more transmission pyrometers configured to analyze the source radiation and the transmitted radiation to determine an inferred temperature proximate the processing area.

16 Claims, 3 Drawing Sheets

Related U.S. Application Data

(60) Provisional application No. 62/511,620, filed on May 26, 2017.

(51) Int. Cl.
*G01J 5/08* (2022.01)
*G01J 5/53* (2022.01)
G01J 5/80 (2022.01)
H05B 3/00 (2006.01)

(56) References Cited

U.S. PATENT DOCUMENTS

| | | | |
|---|---|---|---|
| 7,398,693 B2* | 7/2008 | Ranish | H01L 22/12 |
| | | | 257/E21.53 |
| 7,744,274 B1* | 6/2010 | Grek | G01J 5/601 |
| | | | 438/308 |
| 7,837,383 B2 | 11/2010 | Taylor, II et al. | |
| 8,254,767 B2 | 8/2012 | Hunter et al. | |
| 9,239,265 B2 | 1/2016 | Taylor, II et al. | |
| 2003/0107902 A1* | 6/2003 | Guy | G02B 6/0006 |
| | | | 362/418 |
| 2004/0060917 A1 | 4/2004 | Liu et al. | |
| 2008/0198895 A1 | 8/2008 | Davis et al. | |
| 2010/0054720 A1* | 3/2010 | Hunter | H01L 21/67248 |
| | | | 392/416 |
| 2013/0264316 A1* | 10/2013 | Li | G01J 5/06 |
| | | | 219/121.6 |
| 2014/0192839 A1 | 7/2014 | Lacroix | |
| 2014/0284316 A1 | 9/2014 | Ji | |
| 2015/0092813 A1* | 4/2015 | Timans | H01L 21/67115 |
| | | | 374/45 |
| 2015/0292699 A1 | 10/2015 | Wolfing et al. | |
| 2016/0072587 A1 | 3/2016 | Pilipetskii et al. | |

OTHER PUBLICATIONS

Sensors Unlimited; LC-Series; Extended Wavelength InGaAs Linear Photodiode Arrays; dated Jan. 2016, 2 total pages.
International Search Report and Written Opinion for Application No. PCT/US2018/034735 dated Sep. 19, 2018.
Taiwan Office Action dated Sep. 30, 2021, for Taiwan Patent Application No. 107118122.

\* cited by examiner

CONTINUOUS SPECTRA TRANSMISSION PYROMETRY

CROSS-REFERENCE TO RELATED APPLICATIONS

This application is a divisional of co-pending U.S. patent application Ser. No. 15/990,377, filed May 25, 2018, which claims benefit of U.S. Provisional Patent Application Ser. No. 62/511,620, filed May 26, 2017. Each of the aforementioned related patent applications is herein incorporated in its entirety.

FIELD

Embodiments described herein relate to apparatus and methods of processing substrates. More specifically, apparatus and methods described herein relate to temperature measurement by radiation transmission.

BACKGROUND

Transmission pyrometry is a common mode of assessing the thermal state of a substrate (e.g., a silicon substrate). Thermal processing chambers commonly expose a substrate to intense, non-coherent or coherent radiation to raise the temperature of the substrate, either of the whole substrate or a part or surface area of the substrate. The radiation used to heat the substrate creates a strong background radiation environment in the chamber.

High power radiation is used to assess the thermal state of the substrate because high power radiation can be differentiated from the background radiation in the chamber. Lasers are typically used because lasers offer high power, and because lasers afford the opportunity to select a particular wavelength best suited to the substrate. Lasers produce radiation with a relatively high degree of coherency that, when transmitted through a substrate, can indicate a thermal state of the substrate, which may be registered as a temperature. The transmitted radiation may be detected by a pyrometer, compared to the source radiation, and the result correlated to infer the substrate thermal state. Conventionally, the source radiation is generally selected to be at a small number (e.g., one or two) of narrow wavelength bands. The transmitted radiation, likewise, is analyzed only at a small number (e.g., one or two) of narrow wavelength bands.

For low temperature applications (e.g., silicon substrate temperatures below about 350° C.), transmission pyrometric measurements may be made reliably by utilizing two primary wavelengths of source radiation. However, for higher temperature applications, the signal-to-noise ratio degrades. There is a need for reliable transmission pyrometric measurements at higher temperatures.

SUMMARY

Embodiments described herein relate to apparatus and methods of processing substrates. More specifically, apparatus and methods described herein relate to temperature measurement by radiation transmission.

In an embodiment, a system includes: a continuum radiation source to provide source radiation; a source manifold optically coupled to the continuum radiation source and comprising: a plurality of beam guides, each having a first end that optically couples the beam guide to the continuum radiation source; and a second end; a detector manifold to detect radiation originating from the source manifold and transmitted through a processing area; and one or more transmission pyrometers configured to analyze the source radiation and the transmitted radiation to determine an inferred temperature proximate the processing area.

In an embodiment, a method includes generating source radiation using a continuum radiation source; directing the source radiation to a receiving surface of a substrate; detecting transmitted radiation from an emitting surface of the substrate, the emitting surface being opposite of the receiving surface; analyzing the source radiation and the transmitted radiation to determine an inferred temperature of the substrate.

In an embodiment, a method includes constructing a calibration curve for a calibration substrate disposed in a processing chamber by sequentially: heating the calibration substrate to a plurality of known temperatures; and measuring a transmitted power spectrum at the known temperatures; measuring a test transmitted power spectrum of a test substrate at an unknown temperature, wherein the test substrate has a similar transmission response to the calibration substrate; and using the calibration curve and the test transmitted power spectrum to infer the unknown temperature.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Continuous spectra transmission pyrometry ("CSTP") generally measures spectra of radiation transmitted through a substrate (e.g., a silicon substrate) at a range of wavelengths (more than just one or two primary wavelengths) to infer the temperature of the substrate. CSTP may reliably measure the temperature of the substrate at temperatures above about 350° C. In some embodiments, longer wavelengths (e.g., greater than 1080 nm) of source radiation may be utilized. It is currently believed that longer wavelengths may allow for higher temperature measurements. By measuring radiation spectra at a range of wavelengths, a redundancy of measurement signals may be created. More redundant signals may allow for more accurate temperature measurement.

Figure 1:
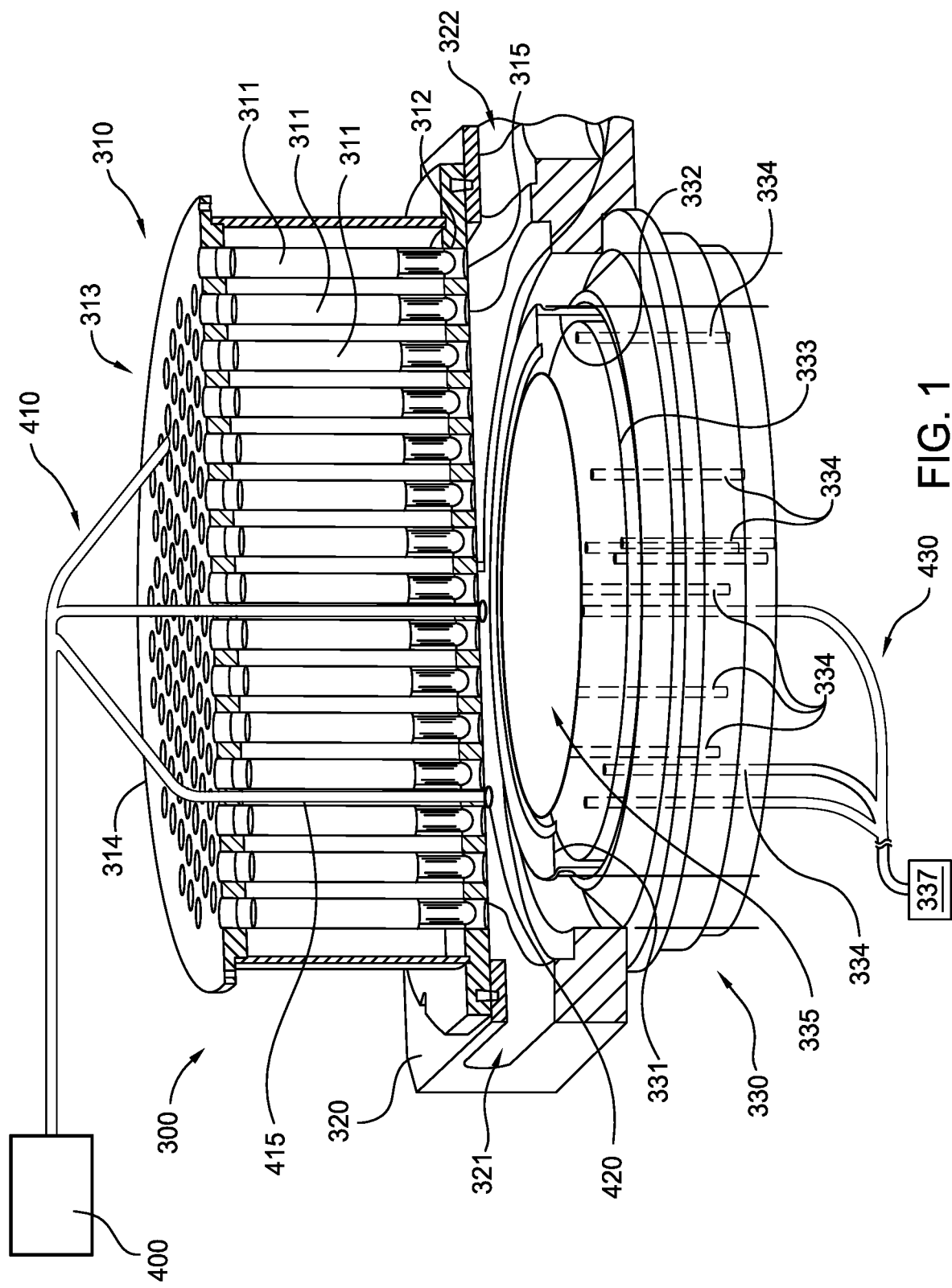
FIG. 1 illustrates an exemplary processing chamber according to embodiments disclosed herein.

FIG. 1 is a partial perspective diagram of a chamber 300 suitable for CSTP. For example, the chamber 300 may be a rapid thermal processing (RTP) chamber. The chamber 300 generally includes a lamp assembly 310, a chamber body 320 and a substrate support assembly 330. For clarity, the chamber 300 has been cross-sectioned, and only the upper portion of chamber body 320 is illustrated in FIG. 1.

Lamp assembly 310 includes a plurality of lamps 311, each of which is positioned inside a reflective tube 312. The lamps may be incandescent lamps, such as tungsten-halogen, or other high output lamps, such as discharge lamps. The reflective tubes 312 are arranged in a honeycomb array 313 inside a water-cooled housing 314. A very thin quartz window 315 forms the bottom surface of lamp assembly 310, separating lamp assembly 310 from the vacuum usually present in chamber 300. Quartz is typically used for quartz window 315 since quartz is transparent to infrared light. Lamp assembly 310 is attached to the upper surface of chamber body 320 in a vacuum-tight manner.

Chamber body 320 includes the walls and floor of chamber 300 as well as a substrate opening 321 and exhaust opening 322. Substrates are delivered into and removed from chamber 300 through substrate opening 321, and a vacuum pump (not shown) evacuates chamber 300 through exhaust opening 322. Slit or gate valves (not shown) may be used to seal substrate opening 321 and exhaust opening 322 when necessary.

The substrate support assembly 330 is contained inside chamber body 320 and includes an edge ring 331, a rotatable quartz cylinder 332, a reflector plate 333 and an array of photo probes 334 (e.g., optical fibers). Edge ring 331 rests on rotatable quartz cylinder 332. During substrate processing, edge ring 331 supports the substrate (not shown for clarity) approximately 25 mm below quartz window 315. Rotatable quartz cylinder 332 may rotates during substrate processing to maximize substrate temperature uniformity during processing by minimizing the effect of thermal asymmetries in chamber 300 on the substrate. Reflector plate 333 is positioned about 5 mm beneath the substrate. Photo probes 334 penetrate reflector plate 333 and are directed at the bottom of the substrate during thermal processing. Photo probes 334 transmit radiant energy from the substrate to one or more pyrometers (e.g., transmission pyrometer 337) for determining substrate temperature, substrate frontside emissivity, and/or reflectivity during thermal processing. The pyrometers measure broadband emissions from the backside of the substrate in a selected range of wavelengths (e.g., between wavelengths of about 200 nm to about 5000 nm).

The transmission pyrometer 337 may include a filter that may provide a spectral response sensitive to the wavelength of the absorption gap at the substrate temperatures between about 100° C. and about 350° C. The particular photodetector used therein may be a silicon photodetector for temperatures below about 350° C., since the absorption gap of silicon varies from about 1000 nm to about 1200 nm for temperatures from room temperature to 350° C. A silicon photodetector may be insensitive to radiation having a wavelength greater than about 1100 nm. For temperatures higher than about 350° C., the absorption edge may be beyond the detection limits of the silicon photodetector, so any further increases in the absorption edge wavelength may not be readily detected.

CSTP generally utilizes a low-divergence, continuum radiation source that generates a wide spectrum of mid-infrared radiation (e.g., including wavelengths from about 1000 nm to about 1700 nm). The source may emit, or include optics to produce, highly collimated radiation. The collimated radiation may be transmitted through a beam guide (e.g., a single mode optical fiber, a multi-mode optical fiber, etc.) onto a silicon substrate. A portion of the collimated radiation may transmit through the substrate. The amplitude of the transmitted radiation may be a function of temperature of the substrate and of the wavelength of the source radiation. A photo probe (e.g., a light pipe) may be aligned to receive the transmitted radiation. For example, the photo probe may be aligned with the beam guide.

The photo probe may direct the transmitted radiation to one or more spectrometers. For example, the photo probe may direct the transmitted radiation to a diffraction grating. The diffraction grating may separate the transmitted radiation in different directions as a function of wavelength. A collimating lens may focus the diffracted radiation to one or more focus points. One or more photodetectors may then measure the radiation as a function of direction, which thereby is a function of wavelength. For example, an indium gallium arsenide linear array may be positioned at the back focal plane of the collimating lens to measure power as a function of wavelength. The power spectrum (as a function of wavelength) of the transmitted radiation may be compared to the power spectrum of the source radiation. The two power spectra may be used to calculate the transmission of the substrate as a function of wavelength. This may then be used to infer temperature of the substrate. In some embodiments, zones of the substrate may be identified, and CSTP may be done on each zone to create a temperature map of the substrate. In some embodiments, longer wavelengths (e.g., greater than 1080 nm) of source radiation may be utilized. It is currently believed that longer wavelengths may allow for higher temperature measurements. In some embodiments, a redundancy of measurement signals may be created. For example, redundant measurement signals may be created by comparing the power spectrum of the transmitted radiation to the power spectrum of the source radiation. More redundant signals may allow for more accurate temperature measurement.

Inference of temperature from the measured power spectrum of transmitted light may be aided by calibrating the detector to a known standard. A substrate may be heated to a known temperature, and the transmitted power spectrum recorded at that known temperature. A calibration curve may be constructed by recording the power spectrum at a plurality of known temperatures. The calibration curve can then be used to infer the temperature of subsequent substrates having the same, or suitably similar, transmission responses. Equilibrium and non-equilibrium readings may be calibrated by controlling the conditions of the equilibrium or non-equilibrium state and relating such conditions to the measured power spectrum.

As illustrated in FIG. 1, substrate support assembly 330 may define a processing area 335, proximate which, during operations, a substrate may be typically disposed. As illustrated, a continuum radiation source 400 is located outside of chamber 300. Other embodiments may have the continuum radiation source 400 inside of the lamp assembly 310, attached to the lamp assembly 310, immediately outside of lamp assembly 310, or otherwise located to suit operational specifications.

The continuum radiation source 400 is configured to generate radiation for input to source manifold 410. The continuum radiation source 400 may be a quantum emission source, such as a continuum laser or an appropriately phosphor coated light emitting diode ("LED"), or a high powered halogen source. The source radiation travels through source manifold 410 and ultimately reaches an incident area of a receiving surface of the substrate (i.e., proximate the processing area 335). For example, source manifold 410 may include a plurality of beam guides 415 interspersed with the reflective tubes 312. A collimating lens 420 may be located at an end of beam guide 415 (i.e., the end closest to the processing area 335). The collimating lens 420 may direct the source radiation onto an incident area of the receiving surface of the substrate. A portion of the source radiation from each beam guide 415 may be transmitted from the receiving surface of the substrate to the opposite, emitting surface of the substrate. For example, the source radiation may be incident on the receiving surface of the substrate at the incident area, and the transmitted radiation may exit the emitting surface of the substrate at the emanating area. The incident area may thus be opposite the emanating area.

A plurality of photo probes 334 may be arranged with an end of each proximate the emitting surface of the substrate. For example, a photo probe 334 may be aligned with a beam guide 415 to detect the transmitted radiation. In some embodiments, each beam guide 415 of the source manifold 410 may have an aligned photo probe 334. In other embodiments, there may be more beam guides 415 than photo probes 334. In still other embodiments, there may be more photo probes 334 than beam guides 415. The collection of photo probes 334 may make up a detector manifold 430. The transmitted radiation may travel through detector manifold 430 and ultimately reach one or more transmission pyrometers 337. In some embodiments, a single transmission pyrometer 337 may receive transmitted radiation from all of the photo probes 334. In some embodiments, multiple transmission pyrometers 337 may be utilized. In some embodiments, detector manifold 430 connects a subset of the photo probes 334 with each transmission pyrometer 337. In some embodiments, detector manifold 430 connects a single photo probe 334 with each transmission pyrometer 337. In some embodiments, detector manifold 430 may utilize optical splitters to deliver transmitted radiation from one photo probe 334 to multiple transmission pyrometers 337. In some embodiments, detector manifold 430 may utilize optical combiners to deliver transmitted radiation from multiple photo probes 334 to a single transmission pyrometer 337.

In some embodiments, continuum radiation source 400 may be configured so that source radiation may be selected over and/or distinguished from background radiation. For example, continuum radiation source 400 may be a bright source so that any background radiation is negligible in comparison. As another example, continuum radiation source 400 may be turned off periodically to sample the background radiation for calibration and/or normalization. In some embodiments, continuum radiation source 400 may be a high-power radiant source, for example a quantum sources such as a laser and/or LED. In some embodiments, continuum radiation source 400 may emit in wavelengths selected to match, or otherwise complement, the spectral characteristics of the detector. In some embodiments, continuum radiation source 400 may be a directed radiation source, for example a collimated or partially collimated source, to direct radiation through the substrate to be received by the detector. Collimation may be selected to match the radiation to the numerical aperture of the detector. Collimation may improve the signal-to-noise ratio of the system.

It should be appreciated that source manifold 410 and/or beam guides 415 may be configured to direct source radiation to a plurality of locations proximate processing area 335 simultaneously or sequentially, as deemed beneficial to various operation conditions. It should be appreciated that source detector manifold 430 and/or photo probes 334 may be configured to receive transmitted radiation from a plurality of locations proximate processing area 335 simultaneously or sequentially, as deemed beneficial to various operation conditions.

The transmission pyrometer 337 may measure the transmitted radiation as a function of wavelength. The power spectrum (as a function of wavelength) of the transmitted radiation may be compared to the power spectrum of the source radiation. For example, in some embodiments, the power spectrum of the source radiation may be obtained directly and/or simultaneously. In some embodiments, a portion of source manifold 410 may be coupled to a portion of detector manifold 430 to provide direct measurement of the source power spectrum. It should be understood that such measurement may be done simultaneously with, or at about the same time as, measurements of the power spectrum of the transmitted radiation. The two power spectra may be used to calculate the transmission of the substrate as a function of wavelength. The calculated transmission may then be used to infer temperature of the substrate.

Figure 2:
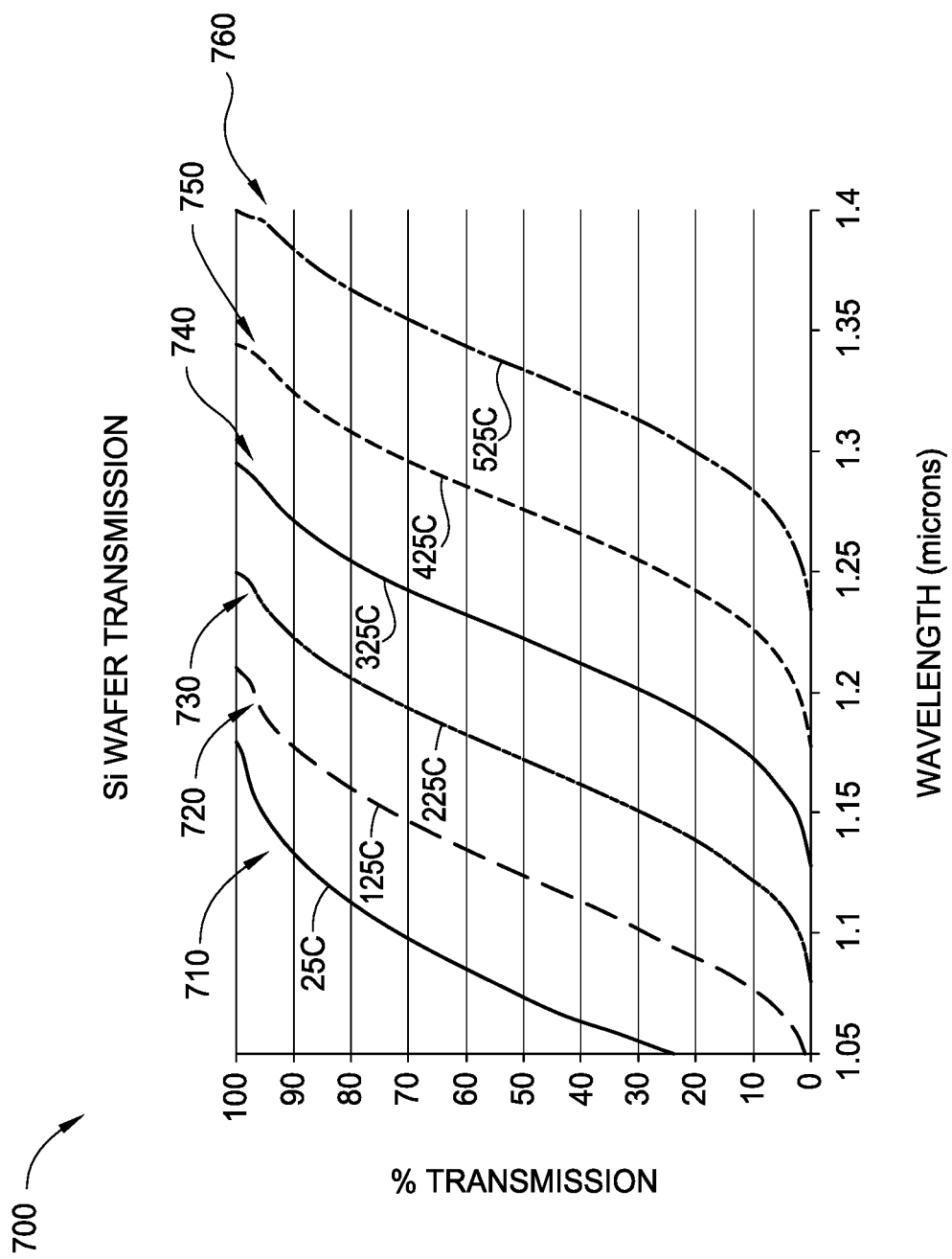
FIG. 2 illustrates an exemplary graph of radiation transmitted through a substrate as a function of wavelength of the radiation.

FIG. 2 illustrates a graph 700 that compares percent of radiation transmitted through a substrate as a function of wavelength of the radiation. Line 710 shows the results at a temperature of 25° C. Line 720 shows the results at a temperature of 125° C. Line 730 shows the results at a temperature of 225° C. Line 740 shows the results at a temperature of 325° C. Line 750 shows the results at a temperature of 425° C. Line 760 shows the results at a temperature of 525° C. A chamber 300 may undergo a calibration procedure that produces data similar to that of graph 700. Thereafter, a source power spectrum and a transmitted radiation power spectrum may be used with the calibration data to infer temperature of a substrate.

In some embodiments, zones of the substrate may be identified, and CSTP may be done on each zone to create a temperature map of the substrate. For example, source manifold 410, beam guides 415, detector manifold 430, and/or photo probes 334 may be configured to measures spectra of radiation transmitted through processing area 335 simultaneously or sequentially, as deemed beneficial to various operation conditions. In some embodiments, longer wavelengths (e.g., greater than 1080 nm) of source radiation may be utilized. It is currently believed that longer wavelengths may allow for higher temperature measurements. In some embodiments, a redundancy of measurement signals may be created. For example, redundant measurement signals may be created by comparing the power spectrum of the transmitted radiation to the power spectrum of the source radiation. More redundant signals may allow for more accurate temperature measurement.

Figure 3:
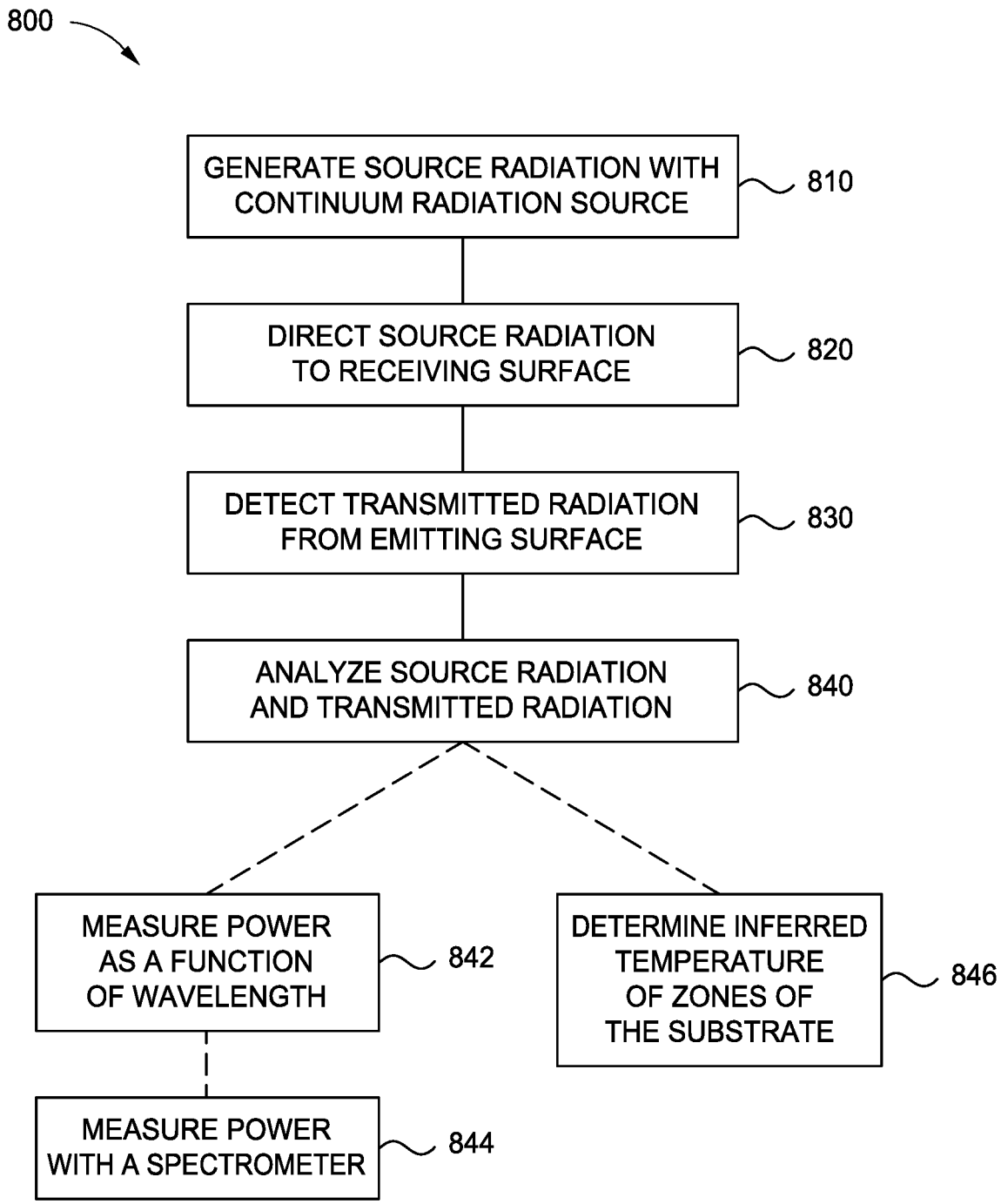
FIG. 3 illustrates an exemplary method of transmission pyrometry according to embodiments disclosed herein.

A method 800 of transmission pyrometry is illustrated in FIG. 3. As illustrated, the method 800 begins at block 810, wherein source radiation is generated with a continuum source. In some embodiments, the source radiation includes a spectrum from visible to mid-infrared. In some embodiments, the source radiation spectrum includes wavelengths from about 1000 nm to about 1700 nm. The method 800 continues at block 820 wherein the source radiation is directed at a substrate, such as a silicon substrate. For example the source radiation may be directed at a receiving surface of the substrate.

The method 800 continues at block 830 wherein transmitted radiation is detected from the substrate. For example the transmitted radiation may be detected from an emitting surface of the silicon substrate. The receiving surface and the transmitting surface may be on opposite sides of the silicon substrate. The method continues at block 840 wherein the source radiation and the transmitted radiation are analyzed. For example, the source radiation and the transmitted radiation may be analyzed to determine an inferred temperature of the substrate. In some embodiments, the method continues at block 842 wherein analyzing the source radiation and the transmitted radiation includes measuring power as a function of wavelength of the transmitted radiation. In some embodiments, as shown at block 844, at least one spectrometer is used to measure power as a function of wavelength of the transmitted radiation. In some embodiments, the method continues from block 840 to block 846, and an inferred temperature of a plurality of zones of the substrate is determined.

What is claimed is:

1. A method comprising:
constructing a calibration curve for a calibration substrate disposed in a processing chamber by sequentially:
heating the calibration substrate to a plurality of known temperatures; and
measuring a transmitted power spectrum at the known temperatures, the measuring the transmitted power spectrum comprising receiving transmitted radiation from an emitting surface of the calibration substrate with a detector manifold, wherein:
the detector manifold comprises:
a plurality of photo probes; and
one or more transmission pyrometers configured to analyze the transmitted radiation,
at least one of the transmission pyrometers is configured to measure power as a function of wavelength of the transmitted radiation, and
the at least one of the transmission pyrometers comprises:
a diffraction grating;
a cylinder lens; and
an indium gallium arsenide linear detector array;
measuring a test transmitted power spectrum of a test substrate at an unknown temperature; and
using the calibration curve and the test transmitted power spectrum to determine the unknown temperature.

2. The method of claim 1, wherein measuring the transmitted power spectrum at the known temperatures further comprises:
generating source radiation using a continuum radiation source; and
directing the source radiation to a receiving surface of the calibration substrate, the emitting surface being opposite of the receiving surface.

3. The method of claim 2, wherein the continuum radiation source has an emission spectrum comprising wavelengths from about 1000 nm to about 1700 nm.

4. The method of claim 2, wherein the continuum radiation source is a quantum emission source.

5. The method of claim 2, wherein directing the source radiation to the receiving surface of the calibration substrate comprises directing the source radiation through a source manifold to the receiving surface of the calibration substrate, wherein:
the source radiation is collimated at the receiving surface, and
the source manifold is optically coupled to the continuum radiation source and comprises a plurality of beam guides.

6. The method of claim 5, wherein at least one of the beam guide comprises a single mode optical fiber.

7. The method of claim 5, wherein each of the beam guide comprises:
a first end that optically couples the beam guide to the continuum radiation source;
a second end; and
a collimating lens at the second end.

8. The method of claim 5, wherein
at least one of the photo probes is aligned with at least one of the beam guides.

9. The method of claim 2, wherein the one or more transmission pyrometers are further configured to analyze the source radiation.

10. The method of claim 1, wherein each of the photo probes comprises:
a third end to receive the transmitted radiation;
a fourth end; and
a diffraction grating at the fourth end.

11. The method of claim 1, wherein the at least one of the transmission pyrometers comprises a spectrometer.

12. The method of claim 1, wherein the detector manifold comprises at least one of an optical splitter and an optical combiner.

13. The method of claim 1, wherein at least one of the known temperatures is greater than 350° C.

14. A method comprising:
constructing a calibration curve for a calibration substrate disposed in a processing chamber by sequentially:
heating the calibration substrate to a plurality of known temperatures; and
measuring a transmitted power spectrum at the known temperatures by:
generating source radiation using a continuum radiation source;
directing the source radiation to a receiving surface of the calibration substrate; and
detecting transmitted radiation from an emitting surface of the calibration substrate with a detector manifold, the emitting surface being opposite of the receiving surface;
measuring a test transmitted power spectrum of a test substrate at an unknown temperature; and
using the calibration curve and the test transmitted power spectrum to determine the unknown temperature, wherein:
the detector manifold comprises:
a plurality of photo probes; and
one or more transmission pyrometers configured to analyze the source radiation and the transmitted radiation,
at least one of the transmission pyrometers is configured to measure power as a function of wavelength of the transmitted radiation, and
the at least one of the transmission pyrometers comprises:
a diffraction grating;
a cylinder lens; and
an indium gallium arsenide linear detector array.

15. The method of claim 14, wherein the at least one of the transmission pyrometers comprises a spectrometer.

16. A method comprising:
constructing a calibration curve for a calibration substrate disposed in a processing chamber by sequentially:
heating the calibration substrate to a plurality of known temperatures; and
measuring a transmitted power spectrum at the known temperatures by:

generating source radiation using a continuum radiation source;

directing the source radiation through a source manifold to a receiving surface of the calibration substrate, wherein the source manifold comprises a plurality of beam guides; and detecting transmitted radiation from an emitting surface of the calibration substrate with a detector manifold, wherein:

the emitting surface is opposite of the receiving surface, the detector manifold comprises:
  a plurality of photo probes, and
  one or more transmission pyrometers configured to analyze the source radiation and the transmitted radiation, at least one of the transmission pyrometers comprises:
  a diffraction grating;
  a cylinder lens; and
  an indium gallium arsenide linear detector array, and at least one of the photo probes is aligned with at least one of the beam guides;

measuring a test transmitted power spectrum of a test substrate at an unknown temperature; and using the calibration curve and the test transmitted power spectrum to determine the unknown temperature.

* * * * *